US 8,849,525 B2

(12) United States Patent
Nishida et al.

(10) Patent No.: US 8,849,525 B2
(45) Date of Patent: Sep. 30, 2014

(54) VEHICLE CONTROL UNIT

(71) Applicant: Fuji Jukogyo Kabushiki Kaisha, Tokyo (JP)

(72) Inventors: Masayuki Nishida, Tokyo (JP); Koichi Inoue, Tokyo (JP); Hiroki Tanaka, Tokyo (JP); Keisuke Ajimoto, Tokyo (JP); Shinya Yasunaga, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/861,301

(22) Filed: Apr. 11, 2013

(65) Prior Publication Data
US 2013/0297159 A1    Nov. 7, 2013

(30) Foreign Application Priority Data
May 2, 2012 (JP) .................. 2012-105036

(51) Int. Cl.
B60K 23/00 (2006.01)
F16H 61/68 (2006.01)
(52) U.S. Cl.
CPC .................................. F16H 61/68 (2013.01)
USPC ............................................ 701/52; 180/336
(58) Field of Classification Search
CPC ............... F16H 61/0248; F16H 61/68; F16H 2061/0225; F16H 2061/0234
USPC ........................... 701/51–55, 67, 68; 180/336
See application file for complete search history.

(56) References Cited

U.S. PATENT DOCUMENTS

2004/0153232 A1* 8/2004 Wada et al. ..................... 701/55
2010/0100289 A1* 4/2010 Tawara et al. ................. 701/52

FOREIGN PATENT DOCUMENTS

| JP | 11-257485 A | 9/1999 |
| JP | 3218962 B2 | 10/2001 |
| JP | 3656482 B2 | 6/2005 |
| JP | 2006097789 A * | 4/2006 |
| JP | 2008115964 A * | 5/2008 |

* cited by examiner

Primary Examiner — Mary Cheung
Assistant Examiner — Rodney Butler
(74) Attorney, Agent, or Firm — McGinn IP Law Group, PLLC

(57) ABSTRACT

There is provided a vehicle control unit. The vehicle control unit provides an automatic mode that automatically determines a gear ratio in accordance with an operational status of a vehicle and a temporary manual mode that, with a driver's operation, selects any one predetermined gear ratio from among predetermined gear ratios set in advance and automatically switches a mode of operation to the automatic mode according to the operational status of the vehicle. When switching a mode of operation from the automatic mode to the temporary manual mode through a downshift operation that changes a gear ratio to a lower one in a transmission and an engine speed is lower than a reference rotational speed set in accordance with a vehicle speed, the vehicle control unit selects any one of the predetermined gear ratios such that the engine speed is equal to or more than the reference rotational speed.

12 Claims, 9 Drawing Sheets

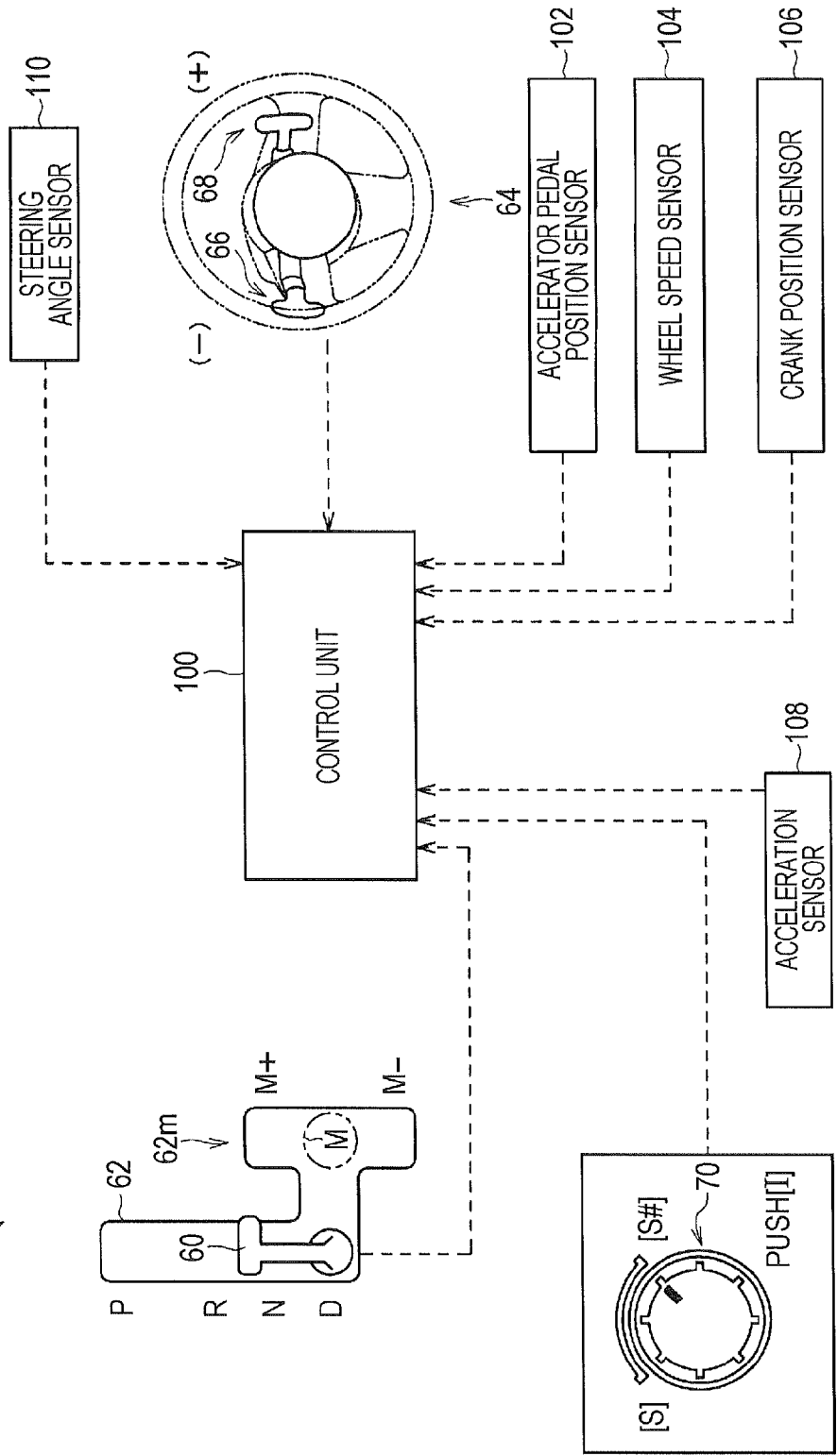

VEHICLE CONTROL UNIT

CROSS-REFERENCE TO RELATED APPLICATIONS

The present application claims priority from Japanese Patent Application No. 2012-105036 filed on May 2, 2012, the entire contents of which are hereby incorporated by reference.

BACKGROUND OF THE INVENTION

1. Field of the Invention

The present invention relates to a vehicle control technology for transmitting mechanical power received from an internal combustion engine through an engine output shaft, to driving wheels through a process of causing a transmission to change a rotational speed.

2. Description of the Related Art

A vehicle, in which mechanical power received from an internal combustion engine through an engine output shaft is transmitted to the driving wheels, typically has a transmission that transmits the mechanical power received through the engine output shaft to the driving wheels after a process of changing a rotational speed (namely, changing a torque). Examples of such a transmission include a continuously variable transmission (CVT) that can change gear ratios in a continuous manner and a geared transmission that changes a rotational speed by selectively using any one of a plurality of gears (gear ratios).

A vehicle equipped with such a transmission typically has a mode of operation (hereinafter referred to as an automatic mode) in which a gear ratio is automatically determined in accordance with an operational status of the vehicle. Such a vehicle also has another mode of operation (hereinafter referred to as a manual mode) in which any one of a plurality of predetermined gear ratios is selected in accordance with a driver's operation and thus the selected gear ratio is used to change a rotational speed in the transmission. Technologies for switching a mode of operation between the automatic and manual modes in accordance with the driver's operation have been proposed (see, for example, Japanese Patent (JP-B) Nos. 3656482 and 3218962).

JP-B No. 3656482 proposes that, at the time of switching a mode of operation from the automatic mode to the manual mode, a gear ratio (fixed gear ratio) in the manual mode immediately after the switching be set to a lower gear ratio than a gear ratio in the automatic mode immediately before the switching so that the rotational speed of a transmission input shaft (transmission input speed) is equal to or more than a predetermined level. Also, JP-B No. 3218962 proposes that, at the time of changing a mode of operation from the automatic mode to the manual mode, a gear ratio to be set in the manual mode be set at a level that is closest to and lower (or higher) than a gear ratio that has been set in the automatic mode.

In the technology described in JP-B No. 3218962, switching the automatic mode to the manual mode is accomplished when the driver shifts a select lever of transmission (shift lever) to a manual mode position from a "D" range position that puts the vehicle in the automatic mode (see FIG. 8 in JP-B No. 3218962) and moreover shifts the select lever of transmission to a "−" position that represents downshifting or a "+" position that represents upshifting.

Furthermore, Japanese Unexamined Patent Application Publication (JP-A) No. 11-257485 proposes a technology for switching an automatic mode to a temporary manual mode through the operation of a downshift switch or an upshift switch provided on a steering wheel without causing the driver to put the select lever of transmission in an "M" range position that puts the vehicle in a manual mode. JP-A No. 11-257485 describes a technology for, in a "temporary manual mode", automatically switching a mode of operation from the temporary manual mode to the automatic mode after the passage of a "predetermined time" set in accordance with an operational status of the vehicle, such as a vehicle speed.

Manual modes include a mode in which a manual mode is terminated and switched to an automatic mode through a driver's operation, for example, driver's shifting of a select lever of transmission from an "M" range position for a manual mode to a "D" range position for the automatic mode, as described in JP-B No. 3218962, and a mode in which, following the operation of a switch provided on a steering wheel, the manual mode is automatically terminated and switched to the automatic mode in accordance with an operational status of the vehicle, as described in JP-A No. 11-257485. In other words, the manual modes include a "selective manual mode" in which a switch to the automatic mode takes place through an operator's predetermined operation and a "temporary manual mode" in which a switch to the automatic mode automatically takes place in accordance with the operational status of the vehicle.

The temporary manual mode is a mode in which, after the automatic mode is temporarily put in the manual mode, a switch to the automatic mode automatically takes place if the operational status of the vehicle meets a predetermined termination condition. For this reason, as compared to the selective manual mode, the temporary manual mode is often configured to make driver operations easier and at the same time more precisely reflect a driver's intention to accelerate or decelerate the vehicle. Accordingly, when the driver makes an attempt to switch a mode of operation from the automatic mode to the temporary manual mode by shifting gear ratios to lower ones through a paddle switch operation or a downshift operation, it is desirable to perform control in such a manner that the driver's intention to decelerate the vehicle is more precisely reflected in the gear ratios.

SUMMARY OF THE INVENTION

The present invention has been achieved in light of the foregoing and an object thereof is to provide a vehicle control technology for enabling a driver's intention to be more precisely reflected in gear ratios when a switch from an automatic mode to a temporary manual mode takes place through a downshift operation.

An aspect of the present invention provides a vehicle control unit for a vehicle in which mechanical power received from an internal combustion engine through an engine output shaft is transmitted to a driving wheel through a process of causing a transmission to change a rotational speed and is capable of controlling the transmission. The vehicle control unit provides an automatic mode, in which a gear ratio is automatically determined in accordance with an operational status of the vehicle and the determined gear ratio is used to change a rotational speed in the transmission, and a manual mode, in which any one of a plurality of predetermined gear ratios that are set in advance is selected in accordance with a driver operation and the selected gear ratio is used to change a rotational speed in the transmission. The manual mode includes a temporary manual mode in which a switch to the automatic mode automatically takes place in accordance with the operational status of the vehicle and, at the time of switching a mode of operation from the automatic mode to the temporary manual mode through a downshift operation that changes a gear ratio to a lower gear ratio, if an engine speed that is a rotational speed of the engine output shaft is lower than a reference rotational speed that is a threshold being determined in accordance with a vehicle speed, any one of the plurality of predetermined gear ratios is selected so that the engine speed is equal to or more than the reference rotational speed.

Preferably, if there are a plurality of predetermined gear ratios at which the engine speed is equal to or more than the reference rotational speed, a gear ratio that is closer to the fastest gear ratio may be selected.

Preferably, the reference rotational speed may be set to a higher level as the vehicle speed increases.

In the above-described vehicle control unit, the reference rotational speed may be changed in accordance with the operational status of the vehicle.

In the above-described vehicle control unit, the reference rotational speed may be changed in accordance with a gradient of a road surface on which the vehicle is travelling.

In the above-described vehicle control unit, the reference rotational speed may be changed to a higher level as a descending slope on which the vehicle is travelling becomes steeper.

In the above-described vehicle control unit, the reference rotational speed may be changed to a lower level as the amount of accelerator pedal operation becomes greater.

At the time of switching a mode of operation to the temporary manual mode, the vehicle control unit allows the engine speed following downshifting to be equal to or more than a predetermined reference rotational speed. As a result, the engine is allowed to generate a certain amount of rotational load or engine braking through the engine output shaft after the downshifting, thereby enabling a driver's intention to decelerate the vehicle to be more precisely reflected in the gear ratio following the downshifting.

BRIEF DESCRIPTION OF THE DRAWINGS

FIG. 2 is a schematic diagram illustrating a system configuration of a vehicle including a vehicle control unit according to an embodiment.

DESCRIPTION OF THE PREFERRED EMBODIMENTS

Figure 1:
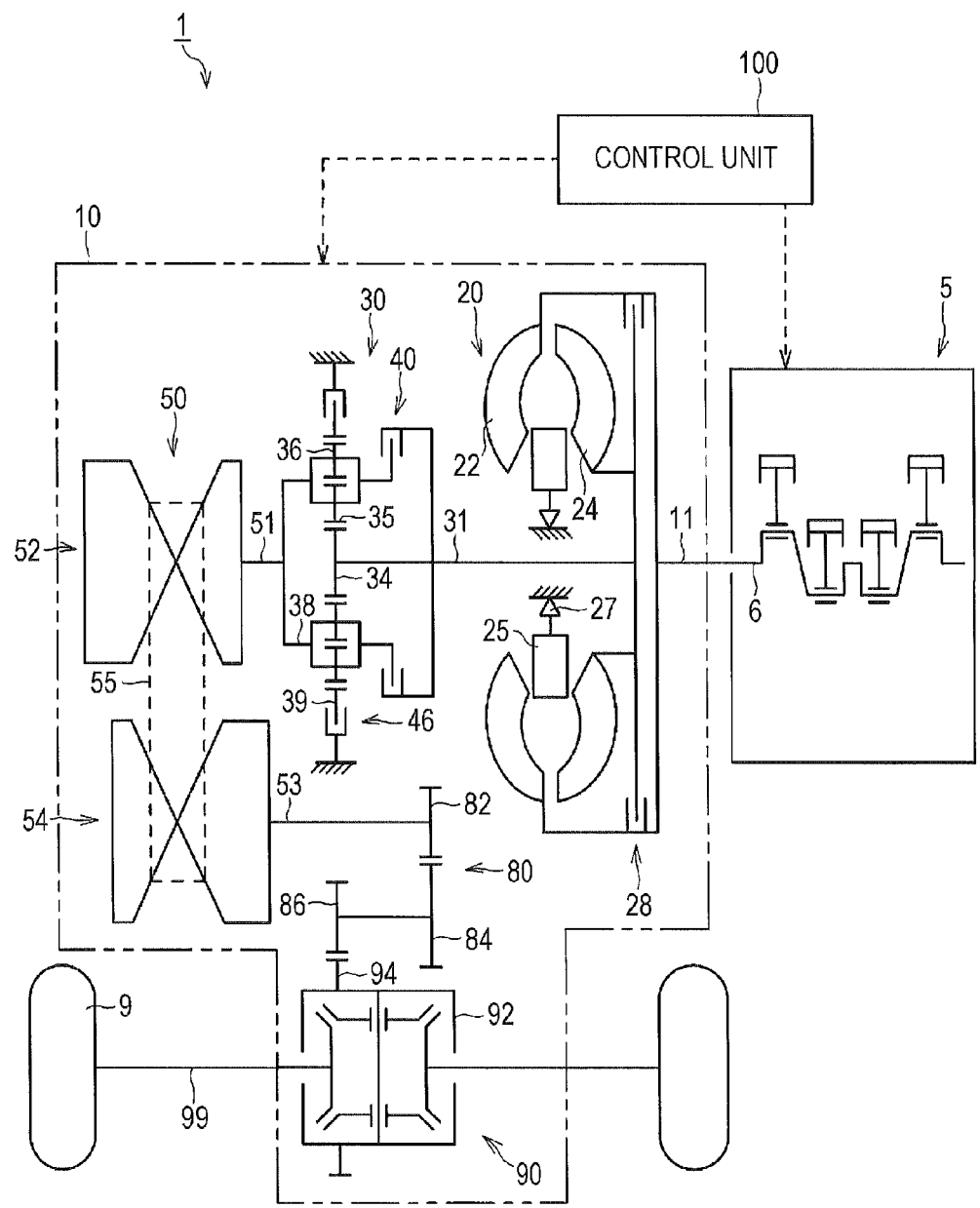
FIG. 1 is a schematic diagram illustrating a configuration of a vehicle and a power transmission system according to an embodiment.

An embodiment according to the present invention (hereinafter referred to as an "embodiment") will be described in detail with reference to the attached drawings. The present invention is typically described with reference to, but not limited to, the following embodiments. Various modifications are conceivable within the scope of the present invention. First, a vehicle and a power transmission system according to the embodiment will be outlined below with reference to FIG. 1. FIG. 1 is a schematic diagram illustrating a configuration of the vehicle and the power transmission system according to the embodiment.

A vehicle 1 is provided with an internal combustion engine 5 as an engine for driving a driving wheel 9. The internal combustion engine 5 is a heat engine that converts energy of a fuel into mechanical energy and outputs the mechanical energy. In this embodiment, the internal combustion engine 5 is a reciprocating engine in which a piston reciprocally moves in a cylinder. The internal combustion engine 5 includes a fuel injection system, an ignition device, and a throttle valve which are not illustrated, all of which are controlled by a vehicle electronic control unit (hereinafter referred to as a "control unit") 100. The internal combustion engine 5 outputs mechanical power through an engine output shaft 6 under the control of the control unit 100. An engine output from the internal combustion engine 5 is controlled by the control unit 100. In the descriptions that follow, the mechanical power that the internal combustion engine 5 outputs through the engine output shaft 6 is referred to as "engine output", while a rotational speed of the engine output shaft 6 is referred to as "engine rotational speed".

The vehicle 1 has a power transmission system 10 that transmits the mechanical power received from the internal combustion engine 5 through the engine output shaft 6, to the driving wheel 9. In this embodiment, the power transmission system 10 includes a torque converter 20 that can transmit the mechanical power from the internal combustion engine 5 through a process of increasing torque with a working fluid therein, a forward/backward switching mechanism 30 that can transmit the mechanical power from the torque converter 20 through a process of switching a rotational direction, and a transmission 50 that can transmit the mechanical power from the internal combustion engine 5 to the driving wheel 9 through a process of changing a rotational speed. The power transmission system 10 receives the mechanical power from the internal combustion engine 5 through the engine output shaft 6 and an input shaft 11 thereof and transmits the mechanical power to the driving wheel 9.

The torque converter 20 is a hydraulic power transmission that includes a pump impeller 22, a turbine runner 24, and a stator 25 and can transmit the mechanical power from the pump impeller 22 to the turbine runner 24 through a process of multiplying torque with a working fluid therein. The torque converter 20 transmits the mechanical power received through the pump impeller 22 to the turbine runner 24 via a working fluid (for example, an automatic transmission fluid (ATF)). The working fluid goes from the pump impeller 22 to the turbine runner 24 and again goes into the pump impeller 22 through a process of causing the stator 25 to change the direction in which the working fluid flows. The torque converter 20 is configured to be able to multiply torque that is transmitted from the pump impeller 22 to the turbine runner 24.

The pump impeller 22 is connected with a member acting as an input of the torque converter 20, namely, the input shaft 11 of the power transmission system 10. The input shaft 11 is connected with the pump impeller 22 so as to turn integrally with each other. The turbine runner 24 is connected with an input shaft 31 of the forward/backward switching mechanism 30. The stator 25 is connected with a one-way clutch 27 which is configured to be engageable with a member that is stationary (hereinafter referred to as a stationary member) among members constituting the power transmission system 10. One example of such a member is a housing that houses the power transmission system 10 therein.

In this embodiment, the torque converter 20 has a lockup clutch 28 that is a clutch capable of coupling the pump impeller 22 and the turbine runner 24. When the lockup clutch 28 is engaged, the pump impeller 22 and the turbine runner 24 rotate integrally with each other, causing the engine output from the internal combustion engine 5 to be straight transmitted from the turbine runner 24 to the forward/backward switching mechanism 30.

In this specification, a state in which a clutch (for example, the lockup clutch 28 or a forward clutch 40) is deactivated to disconnect power transmission between drive rotating members and driven rotating members is referred to as a "released state". In contrast, a state in which the clutch is activated to cause the drive and driven rotating members to rotate integrally with each other at the same rotational speed is referred to as a "coupled state". In addition, a state in which the drive and driven rotating members are engaged with each other to provide a torque transmission therebetween is referred to as an "engaged state". In other words, the "engaged state" includes the "coupled state".

In this specification, a state in which a brake (for example, a rearward brake 46) is activated to cause a moving body to stop rotating is referred to as a "stopped state". In contrast, a state in which the brake is deactivated to cause a moving body to freely rotate in relation to a stationary body is referred to as a "deactivated state". In addition, a state in which a moving body and a stationary body come into contact with each other to cause the moving body to be braked is referred to as a "braked state". In other words, the "braked state" includes the "stopped state".

The forward/backward switching mechanism 30 is composed of double-pinion type (dual-planetary type) planetary pinions, including a sun gear 34 connected with the input shaft 31, an inner planetary pinion 35 meshed with the sun gear 34, an outer planetary pinion 36 meshed with the inner planetary pinion 35, a planetary carrier 38 rotatably supporting the inner planetary pinion 35 and the outer planetary pinion 36, and a ring gear 39 meshed with the outer planetary pinion 36. The planetary carrier 38 is connected with an input shaft (hereinafter referred to as a transmission input shaft) 51 of the transmission 50 to be described later.

Also, the forward/backward switching mechanism 30 has the forward clutch 40 that is a clutch capable of coupling the sun gear 34 and the planetary carrier 38 of a planetary pinion mechanism and the rearward brake 46 that is a brake capable of braking the rotation of the ring gear 39 of the planetary pinion mechanism. The forward/backward switching mechanism 30 causes the sun gear 34, the planetary carrier 38, and the ring gear 39 to rotate together when the forward clutch 40 is put into the coupled state and at the same time the rearward brake 46 is put into the released state. This allows the forward/backward switching mechanism 30 to transmit engine output received through the input shaft 31 to the transmission input shaft 51 without producing any change in rotational direction and rotational speed. In contrast, when the forward clutch 40 is put into the released state and at the same time the rearward brake 46 is put into the stopped state, the planetary carrier 38 rotates in the opposite direction from the sun gear 34. This allows the forward/backward switching mechanism 30 to transmit the engine output received through the input shaft 31 to the transmission input shaft 51 through a process of reversing the rotational direction. Furthermore, when the forward clutch 40 is put into the released state and at the same time the rearward brake 46 is put into the released state, the mechanical power transmission between the sun gear 34 and the planetary carrier 38 is disconnected. The coupled state/released state for the forward clutch 40 and the stopped state/deactivated state for the rearward brake 46 are controlled by the control unit 100 in a coordinated manner.

In this embodiment, the transmission 50 includes a continuously variable transmission (CVT) that can change gear ratios in a continuous manner. The transmission 50 has a transmission input shaft 51 that receives mechanical power through the engine output shaft 6, an input pulley (primary pulley) 52 that is provided coaxially with the transmission input shaft 51 and rotates in synchronization with the transmission input shaft 51, an output shaft (hereinafter referred to as a transmission output shaft) 53 that is provided at a predetermined distance from the transmission input shaft 51 so as to be parallel to it and outputs mechanical power to a reduction mechanism 80, an output pulley (secondary pulley) 54 that is provided coaxially with the transmission output shaft 53 and rotates in synchronization with the transmission output shaft 53, and a power transmission member 55 (indicated by a dotted line in FIG. 1) that is wrapped around the input pulley 52 and the output pulley 54 so as to run between them and transmits mechanical power received from the transmission input shaft 51 to the transmission output shaft 53. The power transmission member 55 may include a metal belt or chain.

The transmission 50 becomes activated when receiving a hydraulic pressure supply and, by changing the pulley width of the input pulley 52, can change a "wrapping diameter" created by the power transmission member 55 wrapped around the input pulley 52. Likewise, by changing the pulley width of the output pulley 54, the transmission 50 can change a "wrapping diameter" created by the power transmission member 55 wrapped around the input pulley 54. In the transmission 50, changing the pulley widths of the input pulley 52 and the output pulley 54 can change the wrapping diameters of the power transmission member 55 in the pulleys 52 and 54, respectively, under the control of the control unit 100. The ratio (Ro/Ri) of the wrapping diameter Ro of the power transmission member 55 in the output pulley 54 to the wrapping diameter Ri of the power transmission member 55 in the input pulley 52 is the gear ratio (Ni/No) that is a ratio of the rotational speed Ni of the transmission input shaft 51 to the rotational speed No of the transmission output shaft 53. The transmission 50 can change the gear ratio (Ni/No) in a continuous manner by continuously changing the pulley width of at least one of the input pulley 52 and the output pulley 54.

The transmission 50 transmits mechanical power received through the transmission input shaft 51 from the transmission output shaft 53 to the reduction mechanism 80 through a process of changing the rotational speed (namely, changing a torque) between the input pulley 52 and the output pulley 54. As described above, the transmission 50 receives mechanical power through the engine output shaft 6 and the transmission input shaft 51 and transmits the mechanical power to the driving wheels 9 through a process of changing the rotational speed.

The reduction mechanism 80 has a drive gear 82 connected to the transmission output shaft 53, a driven gear 84 meshed with the drive gear 82, and a differential drive gear 86 connected to the driven gear 84. The differential drive gear 86 is meshed with a ring gear 94 secured to a differential casing 92 of a differential 90. The reduction mechanism 80 transmits the mechanical power received through the transmission output shaft 53, to the differential 90 through a process of reducing a speed (namely, increasing a torque). The differential 90 transmits the mechanical power from the reduction mechanism 80 to right and left driving shafts 99 after a process of distributing the mechanical power to the driving shafts 99. The driving shafts 99 are connected to the driving wheels 9. The mechanical power received from the engine 5 through the engine output shaft 6 is transmitted to the driving wheels 9 through the power transmission system 10, in other words, the torque converter 20, the forward/backward switching mechanism 30, the transmission 50, the reduction mechanism 80, and the differential 90 in this embodiment. The mechanical power transmitted to the driving wheels 9 generates traction [N] as a friction for driving the vehicle 1 between the driving wheels 9 and a road surface on which the vehicle 1 is running.

With the configuration described above, the vehicle 1 transmits the mechanical power output from the engine 5 and received through the engine output shaft 6, to the driving wheels 9 through a process of causing the transmission 50 to change the rotational speed. In particular, the vehicle 1 has the above-mentioned control unit 100 that controls the gear ratio (Ni/No) in the transmission 50. The configuration of the vehicle control unit 100 according to this embodiment is described below with reference to FIG. 2. FIG. 2 is a schematic diagram illustrating a system configuration of the vehicle 1 including the vehicle control unit 100.

The control unit 100 has CPU as a central processing unit, RAM as main memory, and ROM as an auxiliary storage (memory unit), although these are not illustrated. Control processing programs for controlling various units described above and subjected to control and control parameters preset in the control processing programs (hereinafter referred to as control parameters) are stored in advance in the ROM of the control unit 100. A variable that is set in the RAM in a process of the above-mentioned control processing is referred to as a "control variable".

As illustrated in FIG. 2, the control unit 100 receives a signal for an accelerator pedal position from an accelerator pedal position sensor 102 that detects the position of an accelerator pedal operated by a driver and estimates the amount of accelerator pedal operation (hereinafter referred to as accelerator operation amount) as a control variable. In the description that follows, the accelerator pedal operation by the driver is referred to as an "accelerator operation". Also, the control unit 100 receives a signal for a rotational speed of the driving wheels 9 from a wheel speed sensor 104 that detects the rotational speed of the driving wheels 9 and estimates a travelling speed of the vehicle 1 (hereinafter referred to as vehicle speed) as a control variable. Furthermore, the control unit 100 receives a signal for an engine speed from a crank position sensor 106 that can detect an angular position of rotation of the engine output shaft 6 of the engine 5 and estimates the engine speed as a control variable. Also, the control unit 100 estimates torque (hereinafter referred to as engine torque) acting on the engine output shaft 6 as a control variable on the basis of the above-mentioned control variables.

Also, the control unit 100 receives a signal for an acceleration or deceleration of the vehicle 1 from an acceleration sensor 108 that can detect an acceleration or deceleration of the vehicle 1 and estimates an acceleration or deceleration of the vehicle 1 as a control variable. The vehicle 1 has a steering wheel 64 that is manipulated by the driver. The control unit 100 receives a signal for a steering angle of the steering wheel 64 from a steering angle sensor 110 that detects an angular position of steering of the steering wheel and estimates a steering angle of the steering wheel 64 as a control variable. Also, on the basis of the acceleration or deceleration of the vehicle 1, the control unit 100 estimates as a control variable a gradient of a road surface (hereinafter referred to as a "road gradient") on which the vehicle 1 runs.

As described in FIG. 2, the vehicle 1 has a select lever of transmission 60 that is manipulated by the driver. By putting the select lever of transmission 60 to a position within a gate 62, the driver can select one of driving ranges of the vehicle 1 corresponding to such a position. The driving ranges include a drive range (hereinafter referred to as a D range and indicated as "D" in the attached drawings) that allows the vehicle 1 to travel forward, a neutral range (hereinafter referred to as an N range and indicated as "N" in the attached drawings) that disconnects a power transmission between the engine output shaft 6 of the engine 5 and the driving wheels 9, and a reverse range (hereinafter referred to as an R range and indicated as "R" in the attached drawings) that allows the vehicle 1 to travel backward. In addition, the driving ranges include a parking range (hereinafter referred to as a P range) that is selected when the vehicle 1 is stationary, such as parking, and prevents the driving wheels 9 from rotating.

The gate 62 has a manual mode gate 62m that allows the driver to select a predetermined gear ratio that is set in advance. The manual mode gate 62m has a minus position (indicated by "M−" in the drawings) that allows the driver to shift to a gear ratio for lower speeds, a plus position (indicated by "M+" in the drawings) that allows the driver to shift to a gear ratio for higher speeds, and a neutral position (indicated by a two-dot chain line M in the drawings) that is provided between the plus position and the minus position so as to be located next to a position that is the D range (hereinafter referred to as a "D range position"). When the driver shifts the select lever of transmission 60 from the D range indicated in FIG. 2 to the neutral position (indicated by the two-dot chain line M in the drawings) in the manual mode gate 62m, the control unit 100 determines that an operation for changing a gear ratio of the transmission 50 to that for lower speeds (hereinafter referred to as a downshift operation) has been made. If this occurs, the control unit 100 switches a mode of operation from the "automatic mode" to a "selective manual mode". The "automatic mode" and the "selective manual mode" will be described later in detail. An operation for changing a gear ratio of the transmission 50 to that for higher speeds is hereinafter referred to as an "upshift operation".

Paddle switches 66 and 68 allowing the driver to manipulate them without releasing his/her hands from the steering wheel 64 are provided close to the steering wheel 64. The paddle switch (hereinafter referred to as a minus paddle switch) 66 is a switch for the driver to shift a gear ratio to that for lower speeds, while the paddle switch (hereinafter referred to as a plus paddle switch) 68 is a switch for the driver to shift a gear ratio to that for higher speeds. When the driver manipulates the minus paddle switch 66 with the select lever of transmission 60 being in the D range, the control unit 100 determines that the downshift operation has been made. If this occurs, the control unit 100 switches a mode of operation from the "automatic mode" to a "temporary manual mode". The "temporary manual mode" will be described later in detail.

A dial 70 that is manipulated by the driver is provided close to the gate 62 of the select lever of transmission 60. By setting the dial 70 to a predetermined position, the driver can select one of modes of operation of the vehicle 1 corresponding to the selected predetermined position. The modes of operation that can be selected through the dial 70 include a sport/sharp mode (hereinafter referred to as an "S# mode") in which the engine 5 produces a change in engine torque so as to give a quick response to a driver's accelerator pedal operation and at the same time which places top priority on giving a better acceleration performance to the vehicle 1. Also, the modes of operation that can be selected through the dial 70 include an intelligent mode (hereinafter referred to as an "i mode") in which, with placing top priority on giving better fuel economy, the engine 5 produces a change in engine torque so as to give a slower response to a driver's accelerator pedal operation than that given by the S# mode. Furthermore, the modes of operation that can be selected through the dial 70 include a sport mode (hereinafter referred to as an S mode), which lies midway between the S# mode and the i mode and in which the engine 5 produces a change in engine torque so as to give a quick response to a driver's accelerator pedal operation over the entire range of engine speed. By turning the dial 70 to a predetermined position, the driver can select one of the modes of operation (for example, the S mode or the S# mode) corresponding to such a predetermined position. Also, the driver can select the i mode by depressing the dial 70.

The control unit 100 of the vehicle 1 described above acquires the amount of accelerator pedal operation by the driver, vehicle speed, engine speed, engine torque, acceleration or deceleration of the vehicle 1, and road gradient as control variables indicating the operational status of the vehicle 1. Also, the control unit 100 acquires, as control variables (control flags) indicating a driver's operation, the position of the select lever of transmission 60 in the gate 62 (including the manual mode gate 62m), the steering angle of the steering wheel 64, the operation of the minus paddle switch 66 or the plus paddle switch 68, the position of the dial 70, and the like. On the basis of these control variables and control parameters, the control unit 100 determines a gear ratio (Ni/No) to change rotational speed in the transmission 50 and controls the widths of the input pulley 52 and the output pulley 54 of the transmission 50 so as to give thus determined gear ratio.

[Automatic Mode]

When the select lever of transmission 60 is in the D range and the paddle switches 66 and 68 are not operated, the control unit 100 performs the "automatic mode" in which a gear ratio is automatically determined in accordance with the operational status of the vehicle 1 and the thus determined gear ratio is used to change rotational speed in the transmission 50. The control unit 100 determines a gear ratio in the transmission 50 on the basis of the operational status of the vehicle 1 (for example, the amount of accelerator pedal operation, vehicle speed, engine speed, and engine torque) including the operational status of the engine 5 (engine speed and engine torque). As long as the select lever of transmission 60 is in the D range and the paddle switches 66 and 68 are not operated, the control unit 100 controls the transmission 50 in the automatic mode. Since the transmission 50 is a continuously variable transmission (CVT) in this embodiment, the control unit 100 allows the transmission 50 to vary a gear ratio in a continuous manner when the control unit 100 controls the transmission 50 in the automatic mode.

When the select lever of transmission 60 is shifted from the D range to the neutral position (indicated by the two-dot chain line M in FIG. 2) in the manual mode gate 62m, the control unit 100 keeps the gear ratio used in the above-mentioned automatic mode unchanged. In other words, regardless of the subsequent change in the operational status of the vehicle 1, the control unit 100 keeps the gear ratio used immediately before the selection of the neutral position (indicated by the two-dot chain line M in FIG. 2) for use in the transmission 50 to change rotational speed.

[Manual Mode]

Figure 3A:
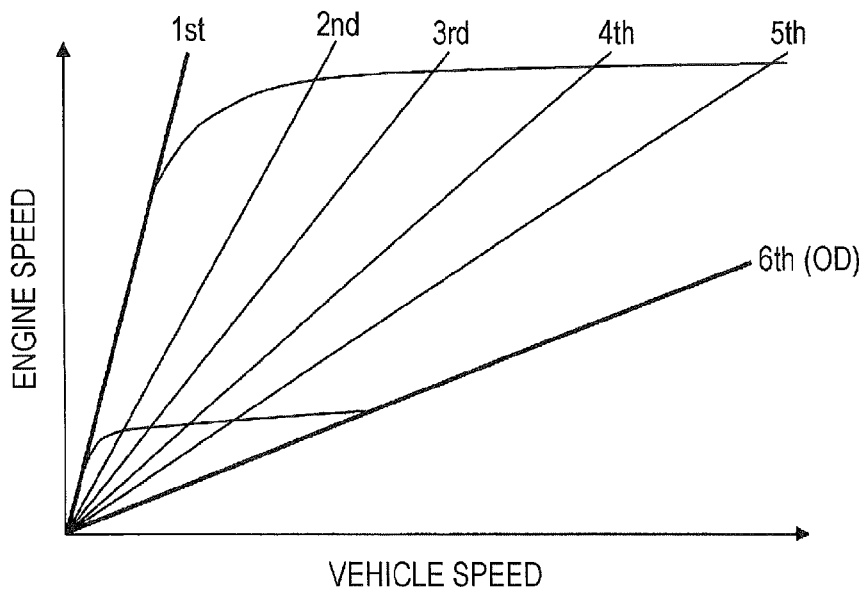
FIGS. 3A and 3B are charts that describe a manual mode provided by a vehicle control unit according to an embodiment and illustrate a plurality of predetermined gear ratios.
Figure 3B:
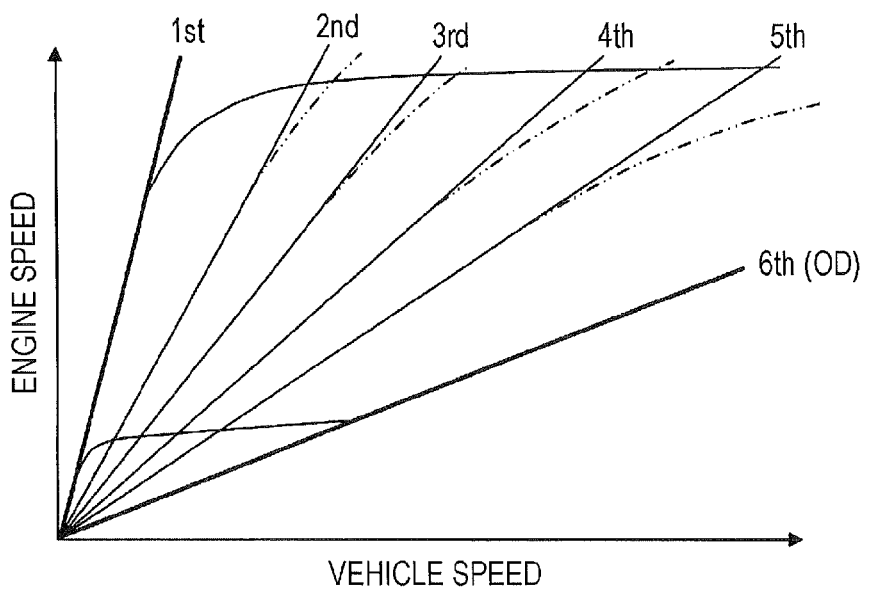

When the select lever of transmission 60 in the D range is shifted from the neutral position indicated by the two-dot chain line M in FIG. 2 to the plus position (M+) or the minus position (M−) in the manual mode gate 62m, or when the minus paddle switch 66 or the plus paddle switch 68 is operated with the select lever of transmission 60 put in the D range, the control unit 100 determines that a downshift operation or an upshift operation has been made. At this time, the control unit 100 provides a "manual mode" in which any one of a plurality of predetermined gear ratios that are set in advance is selected and the thus selected "predetermined gear ratio" is used to change rotational speed. The manual mode is described in detail below with reference to FIGS. 1 through 3B. FIGS. 3A and 3B are charts that describe a manual mode provided by a vehicle control unit and illustrate a plurality of predetermined gear ratios.

The manual mode has a plurality of "predetermined gear ratios" set in advance. FIGS. 3A and 3B illustrate examples of six predetermined gear ratios. In this embodiment, gear ratios include, in descending order of the gear ratios, the first gear ratio (hereinafter referred to as a "first gear" indicated by 1st in the drawings), the second gear ratio (hereinafter referred to as a "second gear" indicated by 2nd in the drawings), the third gear ratio (hereinafter referred to as a "third gear" indicated by 3rd in the drawings), the fourth gear ratio (hereinafter referred to as "fourth gear" indicated by 4th in the drawings), the fifth gear ratio (hereinafter referred to as a "fifth gear" indicated by 5th in the drawings), and the sixth gear ratio (hereinafter referred to as a "sixth gear" indicated by 6th in the drawings). The sixth gear, having a reduction ratio of less than 1.0, is an overdrive gear ratio that increases speed of the transmission output shaft 53 in relation to that of the transmission input shaft 51. In other words, of a plurality of predetermined gear ratios that are set in advance, the slowest gear ratio is the first gear, while the fastest (overdrive) gear ratio is the sixth gear in this embodiment.

In FIG. 3A, the predetermined gear ratios, namely, the first gear, second gear, third gear, fourth gear, fifth gear, and sixth gear are set to but not limited to the fixed values. As illustrated in FIG. 3B, for example, the second through fifth gears may be configured to become faster (the overdrive) as the engine speed increases (as indicated by two-dot chain lines). The predetermined gear ratios are determined in advance from adaptation experiments and are stored as control parameters in the ROM of the control unit 100. The predetermined gear ratios may be stored as control variables in the RAM of the control unit 100 in accordance with the operational status of the vehicle 1.

Figure 4:
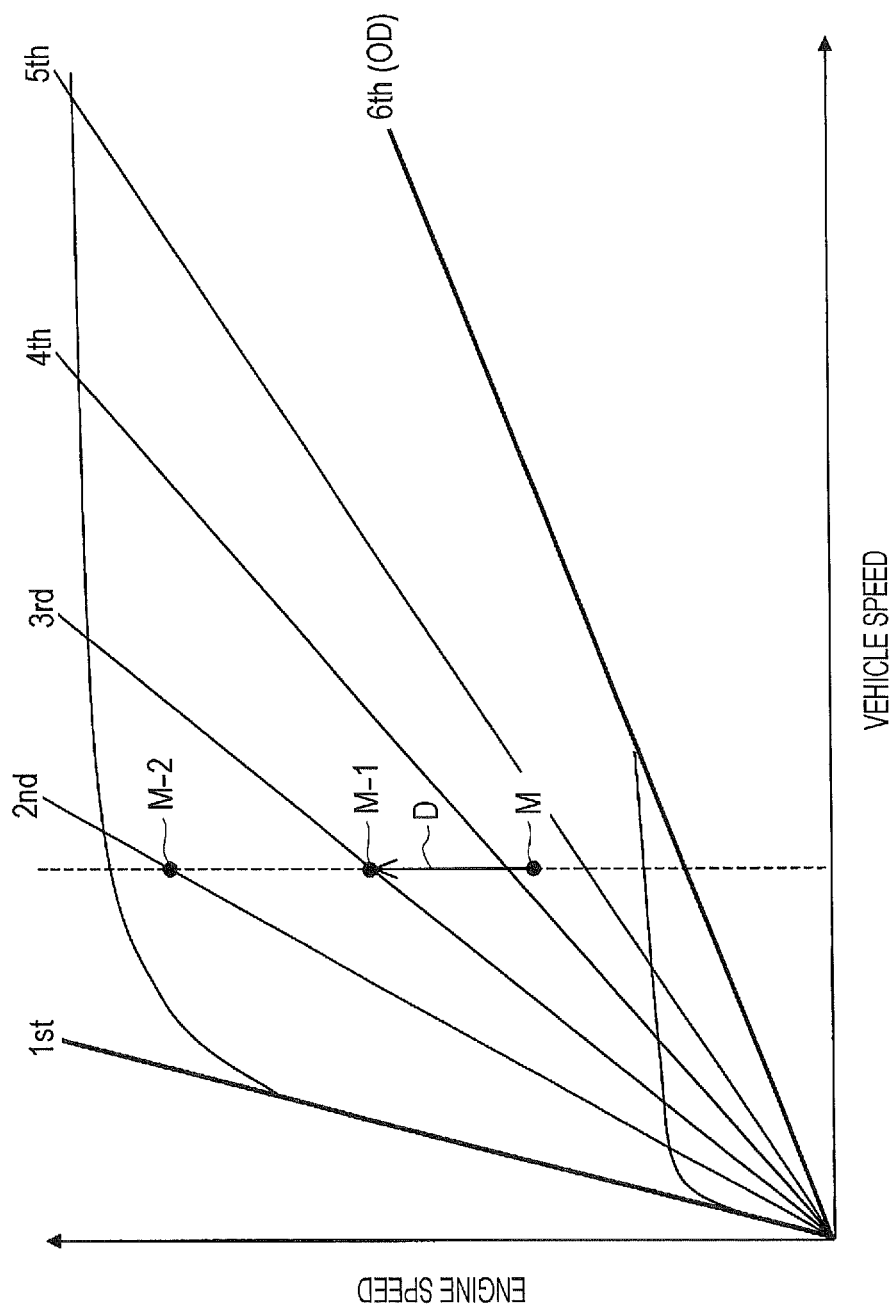
FIG. 4 is a chart that describes a selective manual mode provided by a vehicle control unit according to an embodiment, in which any one of a plurality of predetermined gear ratios is selected to downshift.
Figure 5:
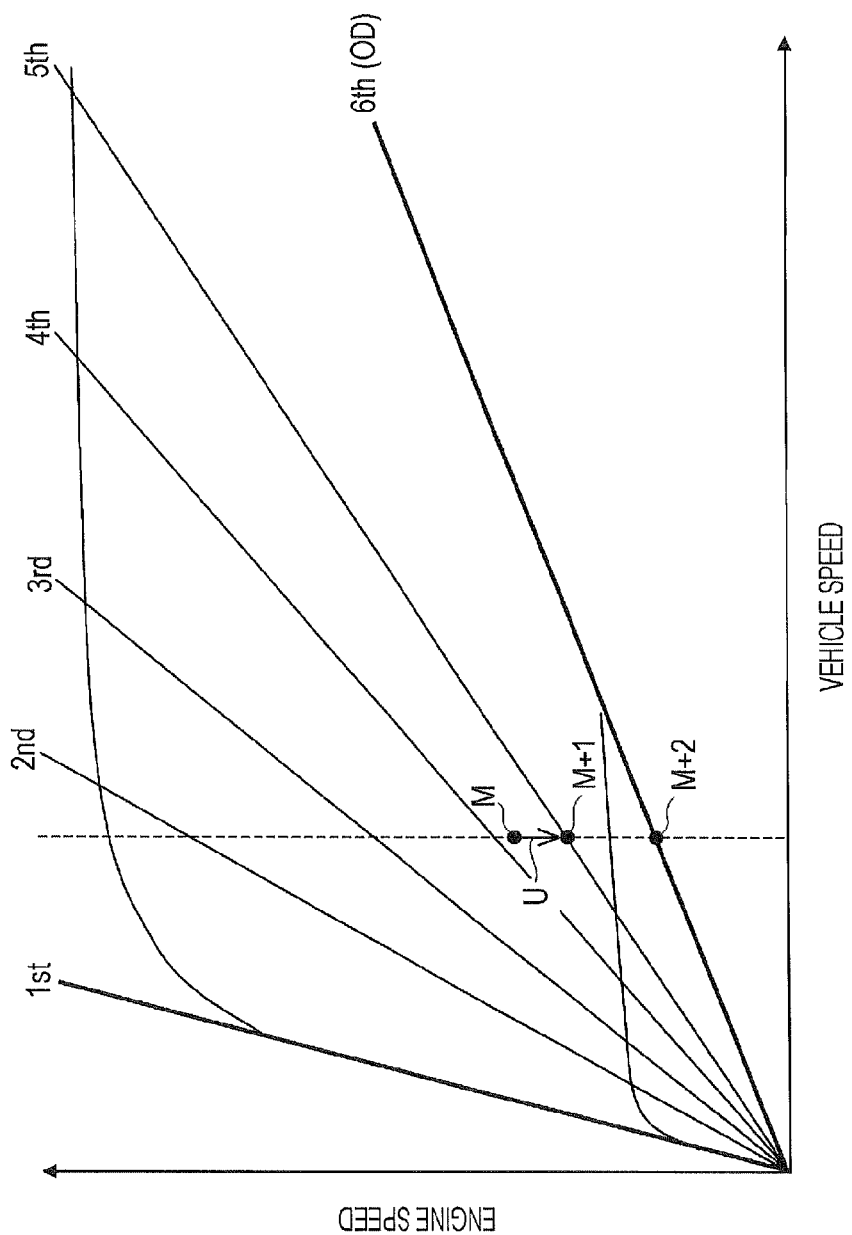
FIG. 5 is a chart that describes a selective manual mode provided by a vehicle control unit according to an embodiment, in which any one of a plurality of predetermined gear ratios is selected to upshift.

In the manual mode, the control unit 100 selects any one of the plurality of (six) predetermined gear ratios in accordance with a driver's operation and uses the thus selected predetermined gear ratio to change rotational speed in the transmission. In this embodiment, the manual mode includes the "selective manual mode" that is terminated by a driver's operation and is switched to the automatic mode and the "temporary manual mode" that is terminated and switched to the automatic mode when the operational status of the vehicle 1 meets predetermined conditions. The selective manual mode is described with reference to FIGS. 1, 2, 4, and 5. FIG. 4 is a chart that describes a selective manual mode provided by the vehicle control unit, in which any one of a plurality of predetermined gear ratios is selected to downshift. FIG. 5 is a chart that describes a selective manual mode provided by the vehicle control unit, in which any one of a plurality of predetermined gear ratios is selected to upshift.

[Selective Manual Mode]

When the select lever of transmission 60 is shifted from the D range to the neutral position (indicated by the two-dot chain line M in FIG. 2) and at that moment a gear ratio of the vehicle 1 is between the fourth and fifth gears, but closer to the fourth gear, as indicated by a dot M in FIG. 4, the control unit 100 considers the gear ratio to be the fourth gear. At this time, when the select lever of transmission 60 is shifted to the minus position (M−) in the manual mode gate 62m, the control unit 100 judges that a downshift operation is performed, selects the third gear (indicated by a dot M−1 in the FIG. 4) that is lower by one step in the reduction ratio than the fourth gear, and thereby downshifts (indicated by an arrow D in FIG. 4) to give the third gear ratio. At this time, the select lever of transmission 60 shifted by the driver to the minus position (M−) is automatically returned to the neutral position. After that, when the select lever of transmission 60 is again shifted to the minus position (M−), the control unit 100 selects the second gear (indicated by a dot M−2 in FIG. 4) that is larger by one step in the reduction ratio than the third gear and thereby downshifts again to give the second gear ratio.

In contrast, when the select lever of transmission 60 is shifted to the plus position (M+) in the manual mode gate 62m, the control unit 100 judges that an upshift operation is performed, selects the fifth gear (indicated by a dot M+1 in FIG. 5) that is smaller by one step in the reduction ratio than the fourth gear, and thereby upshifts (indicated by an arrow U in FIG. 5) to give the fifth gear ratio. At this time, the select lever of transmission 60 shifted by the driver to the plus position (M+) is automatically returned to the neutral position. After that, when the select lever of transmission 60 is again shifted from the neutral position to the plus position (M+), the control unit 100 selects the sixth gear (indicated by a dot M+2 in FIG. 5) that is faster (the overdrive) by one step in the reduction ratio than the fifth gear and thereby upshifts again to give the sixth gear ratio.

As described above, when the driver shifts the select lever of transmission 60 from the D range to the neutral position (indicated by the two-dot chain line M) illustrated in FIG. 2 and moreover shifts it to the plus position (M+) or the minus position (M−) and thereby puts the vehicle in the manual mode, the manual mode is terminated and switched to the automatic mode by the control unit 100 if the select lever of transmission 60 is returned by the driver to the D range from the neutral position. As described above, one of the manual modes which is terminated and switched to the automatic mode in accordance with a driver's operation is the selective manual mode.

[Temporary Manual Mode]

Figure 6:
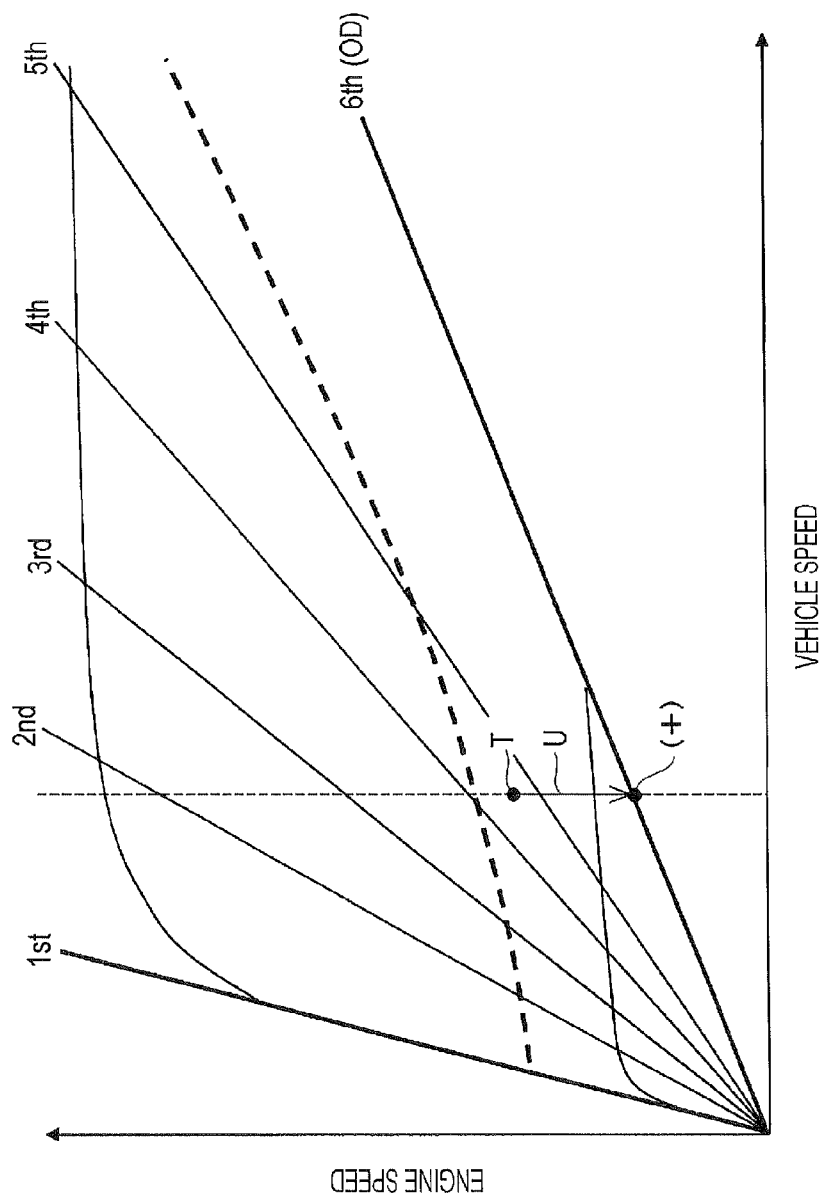
FIG. 6 is a chart that describes a temporary manual mode provided by a vehicle control unit according to an embodiment, in which any one of a plurality of predetermined gear ratios is selected to upshift.
Figure 7:
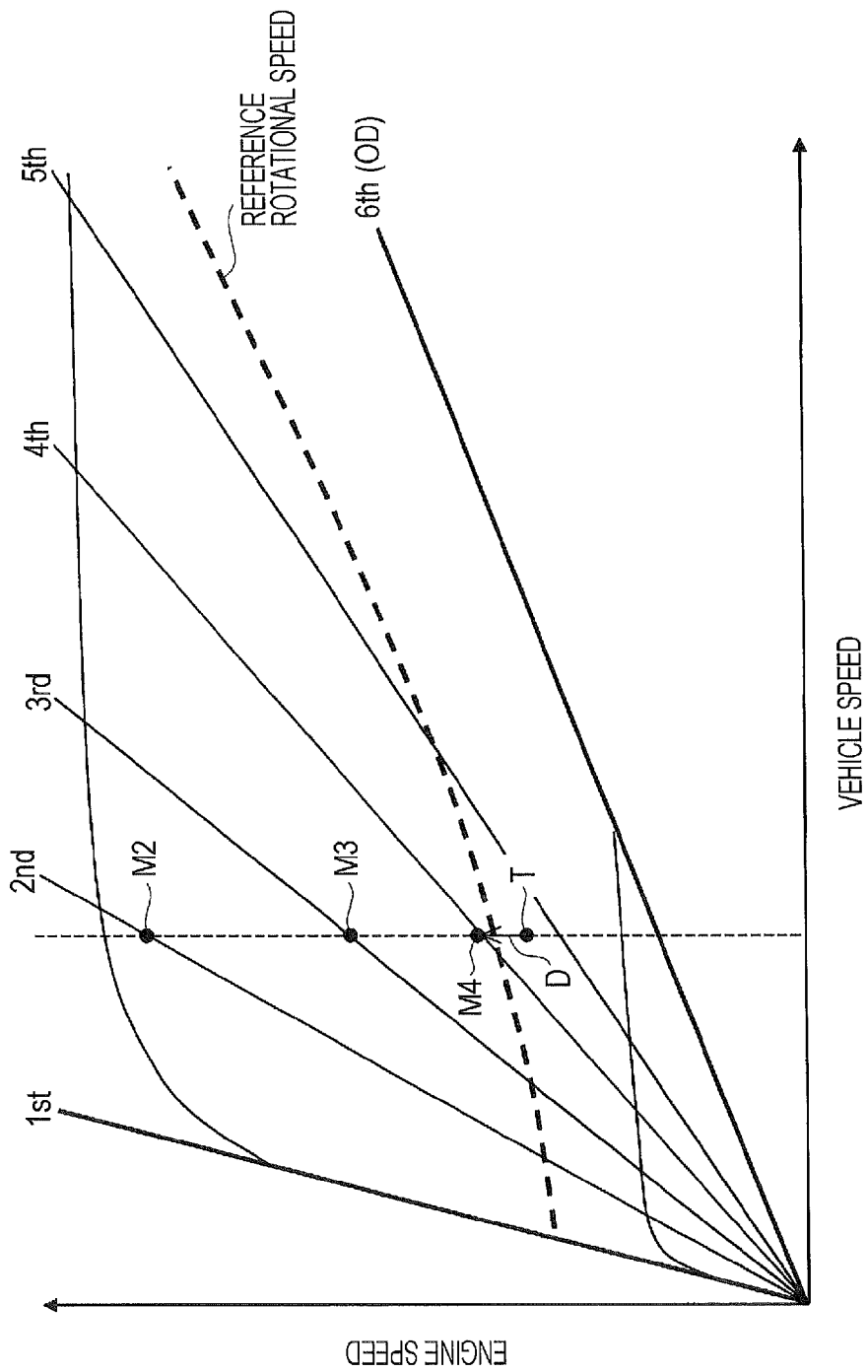
FIG. 7 is a chart that describes a temporary manual mode provided by the vehicle control unit according to an embodiment, in which any one of a plurality of predetermined gear ratios is selected to downshift.

A "temporary manual mode" according to this embodiment is described below with reference to FIGS. 1, 2, 6, and 7. FIG. 6 is a chart that describes the temporary manual mode provided by the vehicle control unit, in which any one of a plurality of predetermined gear ratios is selected to upshift. FIG. 7 is a chart that describes the temporary manual mode provided by the vehicle control unit, in which any one of a plurality of predetermined gear ratios is selected to downshift.

When the select lever of transmission 60 is in the D range and a gear ratio of the vehicle 1 is between the fourth and fifth gears, but closer to the fifth gear, as indicated by a dot T in FIG. 6, the control unit 100 considers the gear ratio to be the fifth gear. At this time, when the driver operates the plus paddle switch 68, the control unit 100 judges that an upshift operation is performed and switches the automatic mode to the temporary manual mode. When switching to the temporary manual mode, the control unit 100 selects the sixth gear (indicated by a dot (+) in FIG. 6) that is faster (the overdrive) by one step in the gear ratio than the fifth gear and thereby upshifts (indicated by an arrow U in FIG. 6) to give the sixth gear ratio.

In contrast, when the select lever of transmission 60 is in the D range and a gear ratio of the vehicle 1 is between the fourth and fifth gears, but closer to the fifth gear, as indicated a dot T in FIG. 7, the control unit 100 considers the gear ratio to be the fifth gear. At this time, when the driver operates the minus paddle switch 66, the control unit 100 judges that a downshift operation is performed and switches the automatic mode to the temporary manual mode. When switching to the temporary manual mode, the control unit 100 selects a predetermined gear ratio for changing rotational speed in the transmission 50 from among the predetermined gear ratios that are lower than the fifth gear and are equal to or higher than a "reference rotational speed" that is set in accordance with the vehicle speed.

The reference rotational speed (indicated by dotted lines in FIGS. 6 and 7) is a threshold for engine speed which is set in accordance with vehicle speed. Higher the vehicle speed, higher the reference rotational speed. In other words, the control unit 100 sets the reference rotational speed to a higher value as the vehicle speed becomes higher. This causes the engine speed following downshifting to become higher as the vehicle speed becomes higher. In addition, if the amount of accelerator pedal operation following the downshifting is zero, the rotational load of the engine output shaft 6 occurring in the engine 5, namely, "engine braking" is allowed to match the vehicle speed. If the amount of accelerator pedal operation following the downshifting is equal to or more than a predetermined level, the engine speed is maintained at the reference rotational speed or higher, thereby making the vehicle 1 ready for acceleration. A table (hereinafter referred to as reference rotational speed table) that associates given vehicle speeds with the reference rotational speeds is determined in advance from adaptation experiments or the like and is stored as a control parameter in the ROM of the control unit 100. The reference rotational speed may be configured as a control variable in the RAM of the control unit 100 in accordance with the operational status of the vehicle 1.

In an example of a dot T in FIG. 7, if there are a plurality of predetermined gear ratios at which engine speed is equal to or higher than the reference rotational speed after downshifting, such as the fourth gear (indicated by a dot M4), the third gear (indicated by a dot M3), and the second gear (indicated by a dot M2), the control unit 100 selects the fourth gear (dot M4) that is closer to the fastest gear (overdrive) from among these predetermined gears (fourth, third, and second gears) at which engine speed is equal to or higher the reference rotational speed and uses the thus selected fourth gear to change rotational speed in the transmission 50. Through the selection of the predetermined gear ratio (fourth gear) that is closer to the fastest gear from among predetermined gear ratios at which engine speed exceeds the reference rotational speed after downshifting, an excessively high engine speed following the downshifting can be avoided.

The control unit 100, after the downshifting, uses the selected predetermined gear ratio (fourth gear) to change rotational speed in the transmission 50. In the temporary manual mode that follows, the control unit 100 automatically terminates and switches the temporary manual mode to the above-mentioned automatic mode if the operational status of the vehicle 1 meets predetermined termination conditions. Specifically, if the vehicle 1 is travelling in a straight line at a constant vehicle speed, the control unit 100 determines that the predetermined termination conditions are satisfied and switches the temporary manual mode to the automatic mode. A determination as to whether or not the vehicle 1 is travelling in a straight line can be made on the basis of whether or not the above-mentioned steering angle falls within a predetermined range. Further, whether the vehicle speed is constant is determined on the basis of whether or not the vehicle speed is within a predetermined range. If the vehicle speed is low, the control unit 100 can also determine that the predetermined termination conditions are satisfied and switch the temporary manual mode to the automatic mode. A determination as to a low vehicle speed can be made on the basis of whether or not the vehicle speed is a predetermined threshold or below. The termination conditions for the temporary manual mode are not limited to the above-mentioned conditions. A combination of various control variables indicating the operational status of the vehicle 1 can be used as the termination conditions. As described above, one of the manual modes which is terminated and switched to the automatic mode in accordance with the operational status of the vehicle 1 is the temporary manual mode.

Although in an example of FIG. 7 the predetermined gear ratio (fourth gear) that is closer to the fastest gear is selected from among the predetermined gears (fourth, third, and second gears) at which engine speed exceeds the reference rotational speed after the downshifting, selection of a predetermined gear ratio associated with downshifting in the temporary manual mode is not limited to this. For example, when the driver keeps the vehicle 1 in the S mode, the control unit 100 may select a predetermined gear ratio (third gear) that is slower by one step than the fastest predetermined gear ratio (fourth gear), while, when the driver keeps the vehicle 1 in the S# mode, the control unit 100 may select a predetermined gear ratio (second gear) that is slower by two steps than the fastest predetermined gear ratio (fourth gear).

[Changing Reference Rotational Speeds According to Road Gradient]

Figure 8:
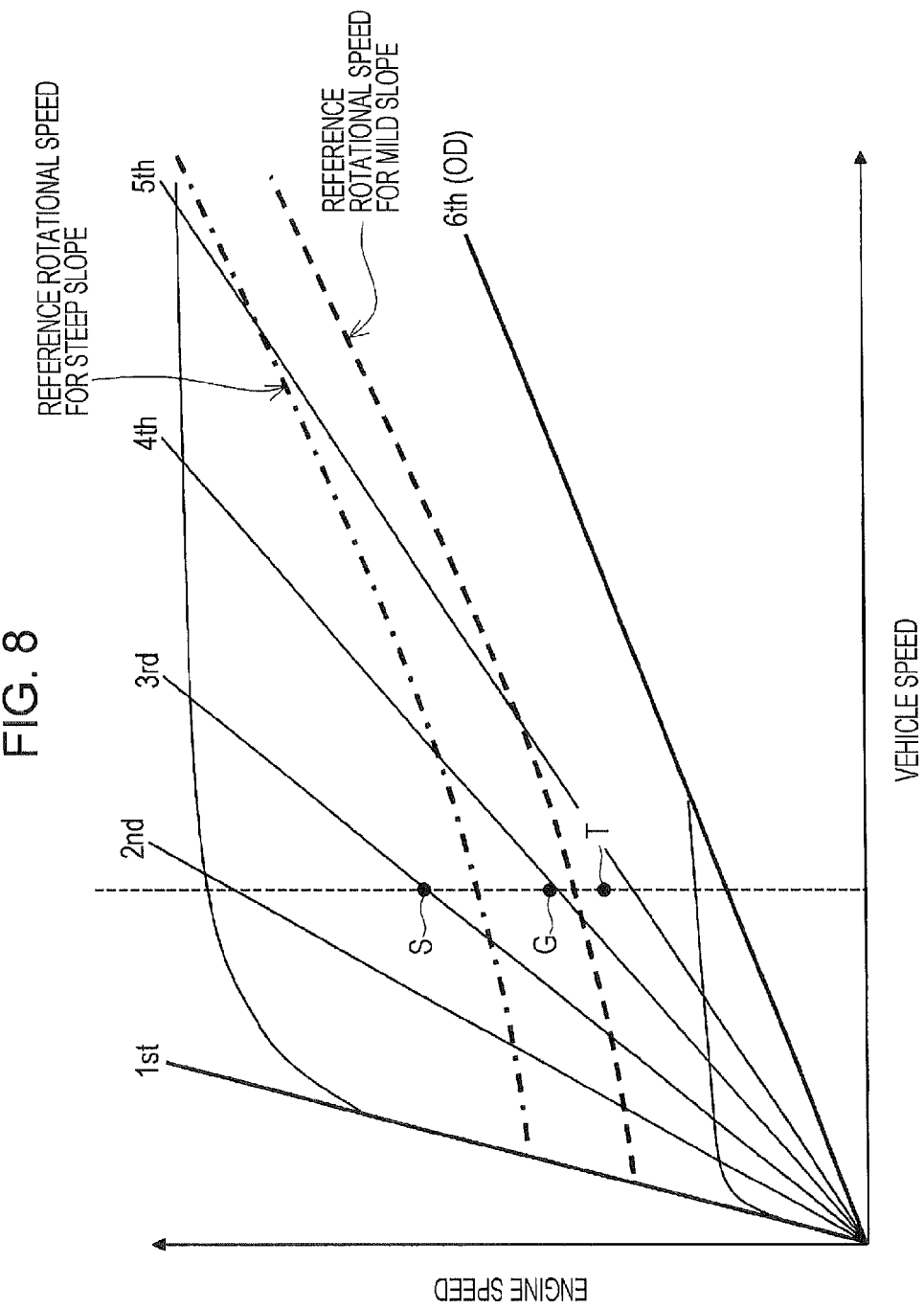
FIG. 8 is a chart describing that a reference rotational speed is varied in accordance with the gradient of a road surface on which a vehicle is running in a temporary manual mode provided by a vehicle control unit according to an embodiment.
Figure 9:
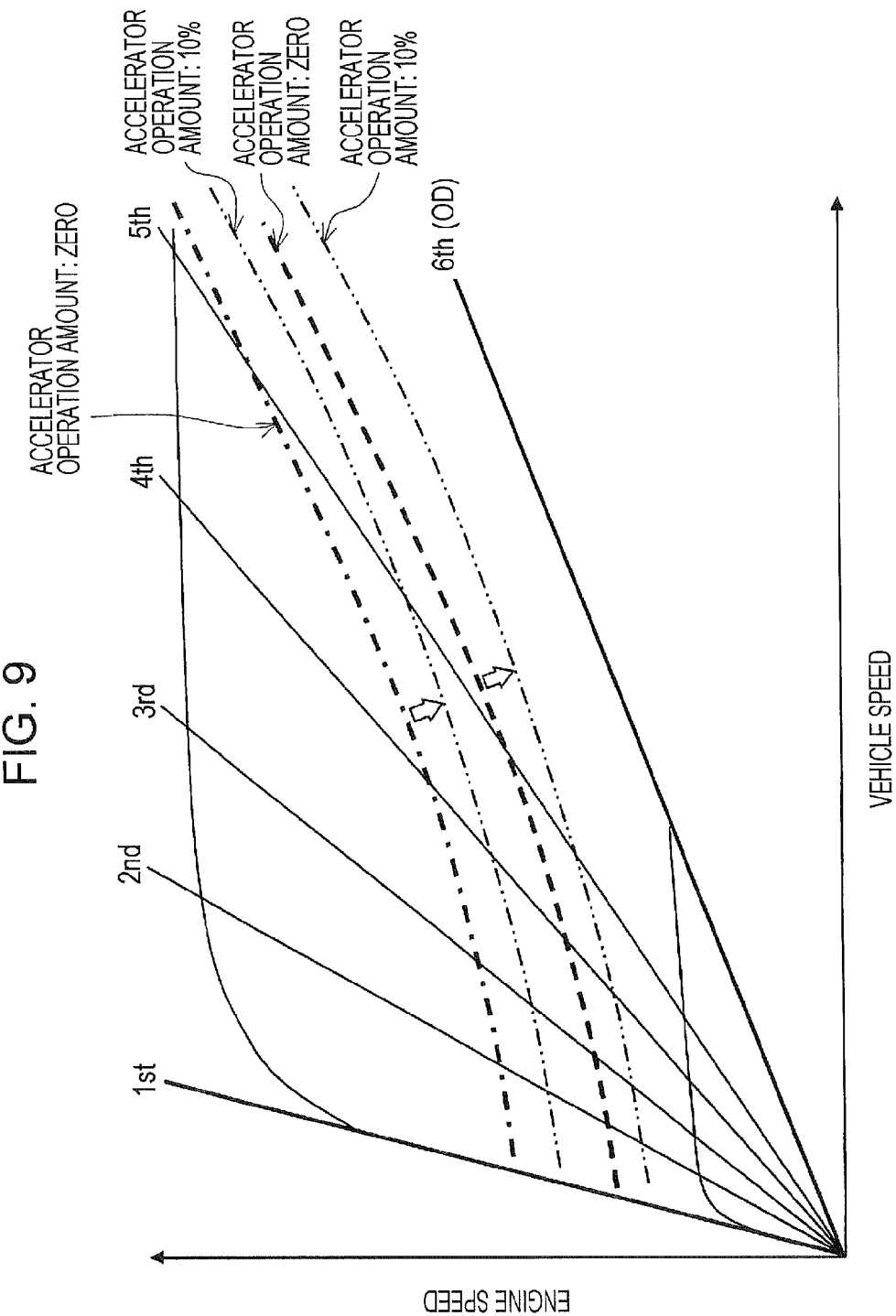
FIG. 9 is a chart describing that a reference rotational speed is varied in accordance with the amount of accelerator pedal operation by a driver, in addition to the gradient of a road surface on which a vehicle is running, in a temporary manual mode provided by a vehicle control unit according to an embodiment.

In the example of FIG. 7, the reference rotational speed is determined with reference to a table (hereinafter referred to as a reference rotational speed table) that associates given vehicle speeds with reference rotational speeds and is stored as a control parameter in the ROM of the control unit 100, but a method for setting a reference rotational speed by the control unit 100 is not limited to this. For example, the control unit 100 can vary the reference rotational speed in accordance with the gradient of a road surface on which the vehicle 1 is running, which is described below using FIGS. 8 and 9. FIG. 8 is a chart describing that reference rotational speeds are varied in accordance with the gradient of a road surface on which the vehicle is running in the temporary manual mode provided by the vehicle control unit. FIG. 9 is a chart describing that reference rotational speeds are varied in accordance with the amount of accelerator pedal operation by the driver, in addition to the gradient of a road surface on which the vehicle is running, in the temporary manual mode provided by the vehicle control unit.

As illustrated in FIG. 8, the control unit 100 has two reference rotational speeds, one corresponding to a steep descending slope on which the vehicle 1 is running and the other corresponding to a mild descending slope. In other words, the control unit 100 has a reference rotational speed for a steep descending slope (hereinafter referred to as steep slope reference rotational speed) indicated by a chain line in FIG. 8 and a reference rotational speed for a mild descending slope (hereinafter referred to as mild slope reference rotational speed) indicated by a dashed line in FIG. 8. Like the above-mentioned reference rotational speed, the steep slope and mild slope reference rotational speeds are set so as to become higher as the vehicle speed becomes higher. A table (hereinafter referred to as a steep slope reference rotational speed table) that associates given vehicle speeds with steep slope reference rotational speeds and a table (hereinafter referred to as a mild slope reference rotational speed table) that associates given vehicle speeds with mild slope reference rotational speeds are determined in advance from adaptation experiments and stored as a control parameter in the ROM of the control unit 100.

When the select lever of transmission 60 is in the D range and a gear ratio of the vehicle 1 is between the fourth and fifth gears, but closer to the fifth gear, as indicated by a dot T in FIG. 8, the control unit 100 considers the gear ratio to be the fifth gear. At this time, when the driver operates the minus paddle switch 66, the control unit 100 switches the automatic mode to the temporary manual mode. When switching to the temporary manual mode, the control unit 100 acquires the gradient of a road surface as a control variable.

When determining at the time of switching to the temporary manual mode that a road on which the vehicle is running is a mild descending slope, the control unit 100 calculates a mild slope reference rotational speed corresponding to a vehicle speed with reference to the mild slope reference rotational speed table. In addition, if the engine speed associated with a switch to the temporary manual mode is lower than the mild slope reference rotational speed, the control unit 100 calculates predetermined gear ratios at which the engine speed is equal to or higher than the mild slope reference rotational speed after downshifting. In this example, the predetermined gear ratios at which the engine speed is equal to or higher than the mild slope reference rotational speed include the fourth gear (indicated by a dot G in FIG. 8), the third gear (indicated by a dot S in FIG. 8), and the second gear. The control unit 100 selects the fourth gear that is closer to the fastest gear from among the predetermined gear ratios (fourth, third, and second gears) and downshifts to the predetermined gear ratio of the thus selected fourth gear.

In contrast, when determining at the time of switching to the temporary manual mode that a road on which the vehicle is running is a steep descending slope, the control unit 100 calculates a steep slope reference rotational speed corresponding to a vehicle speed with reference to the steep slope reference rotational speed table. In addition, if the engine speed associated with a switch to the temporary manual mode is lower than the steep slope reference rotational speed, the control unit 100 calculates predetermined gear ratios at which the engine speed is equal to or higher than the steep slope reference rotational speed after downshifting. In this example, the predetermined gear ratios at which the engine speed is equal to or higher than the steep slope reference rotational speed include the third gear (indicated by the dot S in FIG. 8) and the second gear. The control unit 100 selects the third gear that is closer to the fastest gear from among the predetermined gear ratios (third and second gears) and downshifts to the predetermined gear ratio of the thus selected third gear.

When the automatic mode is switched to the temporary manual mode during travelling on a relatively steep descending slope, performing control as described above allows the engine 5 to generate an increased "engine braking" force following the downshifting. In contrast, during travelling on a relatively mild descending slope, the engine speed can be prevented from rising to a relatively high speed, thereby allowing the engine 5 to emit less noise.

In an example illustrated in FIG. 8, the control unit 100 makes a determination at the time of switching from the automatic mode to the temporary manual mode as to whether or not a descending slope on which the vehicle 1 is running is steep and, in accordance with such determination, switches between the tables and thereby changes the reference rotational speed, but the method of changing the reference rotational speed in accordance with the gradient of a road is not limited to this. The reference rotational speed may be set to become higher as a descending slope on which the vehicle is running becomes steeper. For example, it is also preferable that the reference rotational speed is varied continuously in accordance with the degree of a descending slope (steepness).

In the example illustrated in FIG. 8, the control unit 100, at the time of switching from the automatic mode to the temporary manual mode, changes the reference rotational speed to a higher level as a descending slope on which the vehicle is running becomes steeper, but the method of varying the reference rotational speed in accordance with the gradient of a road is not limited to this. For example, the reference rotational speed may be set to become higher as an ascending slope on which the vehicle is running becomes steeper. Such a setting of the reference rotational speed, when a mode of operation is switched to the temporary manual mode during travelling on a steep ascending slope, allows the engine speed following the downshifting to be set to a relatively higher level, thereby allowing the vehicle 1 to get a better acceleration performance.

In the example illustrated in FIG. 8, the control unit 100 changes the reference rotational speed in accordance with the "gradient of a road" associated with a switch from the automatic mode to the temporary manual mode, but the method of changing the reference rotational speed is not limited to this. The reference rotational speed may be changed in accordance with the control variable that indicates the operational status of the vehicle 1. For example, the reference rotational speed may be changed in accordance with the amount of accelerator pedal operation by the driver, in addition to the gradient of a road.

As illustrated in FIG. 9, when determining at the time of switching from the automatic mode to the temporary manual mode that the amount of accelerator pedal operation is zero, namely, the driver has an intention to decelerate the vehicle 1, the control unit 100 may use the steep slope reference rotational speed (indicated by a chain line) and the mild slope reference rotational speed (indicated by a dashed line) as illustrated in FIG. 8 without any modification. In addition, when determining that the amount of accelerator pedal operation is 10%, namely, the driver has no intention to decelerate the vehicle 1, the control unit 100 may change the steep slope reference rotational speed and mild slope reference rotational speed to lower levels than those when the amount of accelerator pedal operation is determined to be zero; as indicated by a two-dot chain line in FIG. 9. Such a setting of the reference rotational speed, if the driver has no intention to decelerate the vehicle 1 after downshifting, can prevent an increase in the engine speed following the downshifting, thereby preventing the engine 5 from producing a greater engine braking force.

As described above, the vehicle control unit 100 according to this embodiment is used in the vehicle 1 that transmits the mechanical power received from the internal combustion engine 5 through the engine output shaft 6, to the driving wheel 9 through a process of causing the transmission 50 to change rotational speed. Thus, the vehicle control unit 100 is capable of controlling the transmission and is configured to provide the "automatic mode" in which a gear ratio is automatically determined in accordance with the operational status of the vehicle 1 and the thus determined gear ratio is used to change rotational speed in the transmission and the "manual mode" in which any one of a plurality of (six) predetermined gear ratios (first to sixth gears) that are set in advance is selected and thus selected predetermined gear ratio is used to change rotational speed in the transmission 50. The manual mode includes the "selective manual mode" that is terminated by a driver's operation and is switched to the automatic mode and the "temporary manual mode" that is terminated and switched to the automatic mode in accordance with the operational status of the vehicle 1.

If, at the time of switching a mode of operation from the automatic mode to the temporary manual mode through a "downshift operation" that changes a gear ratio to a lower one in the transmission 50, an "engine speed" that is the rotational speed of the engine output shaft 6 is lower than the "reference rotational speed" that is a threshold for the engine speed set in accordance with a vehicle speed, the vehicle control unit 100 is configured to select any one of the plurality of (six) predetermined gear ratios in such a manner that the engine speed is equal to or more than the reference rotational speed. At the time of switching a mode of operation to the temporary manual mode, the vehicle control unit 100 allows the engine speed following downshifting to be equal to or more than a predetermined reference rotational speed. As a result, the engine 5 generates a certain amount of rotational load or engine braking through the engine output shaft 6 after the downshifting, thereby enabling a driver's intention to decelerate the vehicle 1 to be more precisely reflected in the gear ratio following the downshifting.

The vehicle control unit 100 according to this embodiment, if there are more than one predetermined gear ratio at which engine speed is equal to or more than the reference rotational speed, selects a predetermined gear ratio that is closer to the fastest gear from among the plurality of predetermined gear ratios. Accordingly, an excessively high engine speed following downshifting and a resulting excessively large engine braking force can be prevented from acting on the engine 5.

Also, the vehicle control unit 100 according to this embodiment is configured to set a higher reference rotational speed as vehicle speed becomes higher. Accordingly, an engine braking force acting on the engine 5 after downshifting is allowed to match the vehicle speed.

The transmission 50 is a continuously variable transmission (CVT) in this embodiment, but a transmission according to the present invention is not limited to this. The present invention can be applied to any transmission which is capable of transmitting the mechanical power received through the engine output shaft 6 to the driving wheels 9 after a process of changing a rotational speed. For example, the present invention can be applied to a geared transmission that changes a rotational speed by selectively using any one of a plurality of gears (gear steps). If the present invention is applied to the geared transmission, "a plurality of predetermined gear ratios that are set in advance" according to the present invention correspond to a plurality of gears (gear steps) that constitute the geared transmission.

What is claimed is:

1. A vehicle control unit for a vehicle in which mechanical power received from an internal combustion engine through an engine output shaft is transmitted to a driving wheel through a process of causing a transmission to change a rotational speed and that is capable of controlling the transmission, the vehicle control unit comprising:
    a gear ratio determination unit which, in an automatic mode, automatically determines a gear ratio in accordance with an operational status of the vehicle, the determined gear ratio being used to change a rotational speed in the transmission;
    a selecting unit which, in a manual mode, selects one of a plurality of predetermined gear ratios that are set in advance, in accordance with a driver operation, the selected gear ratio being used to change a rotational speed in the transmission,
    wherein the manual mode includes a temporary manual mode in which a switch to the automatic mode automatically takes place in accordance with the operational status of the vehicle,
    wherein at the time of switching a mode of operation from the automatic mode to the temporary manual mode through a downshift operation that changes a gear ratio to a lower gear ratio, if an engine speed that is a rotational speed of the engine output shaft is lower than a reference rotational speed that is a threshold being determined in accordance with a vehicle speed, any one of the plurality of predetermined gear ratios is selected so that the engine speed is equal to or more than the reference rotational speed, and
    wherein, if there are a plurality of predetermined gear ratios at which the engine speed is equal to or more than the reference rotational speed, the selecting unit selects a gear ratio that is closest to the fastest gear ratio.

2. The vehicle control unit according to claim 1, wherein the reference rotational speed is set to a higher level as the vehicle speed increases.

3. The vehicle control unit according to claim 2, wherein the reference rotational speed is changed in accordance with the operational status of the vehicle.

4. The vehicle control unit according to claim 3, wherein the reference rotational speed is changed in accordance with a gradient of a road surface on which the vehicle is travelling.

5. The vehicle control unit according to claim 4, wherein the reference rotational speed is changed to a higher level as a descending slope on which the vehicle is travelling becomes steeper.

6. The vehicle control unit according to claim 5, wherein the reference rotational speed is changed to a lower level as the amount of accelerator pedal operation becomes greater.

7. The vehicle control unit according to claim 1, wherein the switch to the automatic mode from the temporary manual mode occurs when a steering angle of the vehicle is within a predetermined range.

8. The vehicle control unit according to claim 1, wherein a reference rotational speed table that associates given vehicle speeds with the reference rotational speeds is determined in advance.

9. The vehicle control unit according to claim 1, wherein the switch to the automatic mode from the temporary manual mode occurs if the vehicle is travelling in a straight line at a constant vehicle speed.

10. The vehicle control unit according to claim 1, wherein, if the amount of an accelerator pedal operation following the downshifting is equal to or more than a predetermined level, the engine speed is maintained at the reference rotational speed.

11. The vehicle control unit according to claim 10, wherein, if the amount of the accelerator pedal operation following the downshifting is equal to or more than the predetermined level, the engine speed is maintained higher than the reference rotational speed.

12. A vehicle control unit for a vehicle in which mechanical power received from an internal combustion engine through an engine output shaft is transmitted to a driving wheel through a process of causing a transmission to change a rotational speed and that is capable of controlling the transmission, the vehicle control unit comprising:
    a gear ratio determination unit which, in an automatic mode, automatically determines a gear ratio in accordance with an operational status of the vehicle, the determined gear ratio being used to change a rotational speed in the transmission;
    a selecting unit which, in a manual mode, selects one of a plurality of predetermined gear ratios that are set in advance, in accordance with a driver operation, the selected gear ratio being used to change a rotational speed in the transmission,
    wherein the manual mode includes a temporary manual mode in which a switch to the automatic mode automatically takes place in accordance with the operational status of the vehicle, and
    wherein at the time of switching the mode of operation from the automatic mode to the temporary manual mode through a downshift operation that changes a gear ratio to a lower gear ratio, if an engine speed that is a rotational speed of the engine output shaft is lower than a reference rotational speed that is a threshold being determined in accordance with a vehicle speed, the selecting unit selects a gear ratio closest to the reference rotational speed so that the engine speed is equal to or more than the reference rotational speed.

* * * * *